United States Patent
Betancourt (10) Patent No.: US 9,558,486 B2
(45) Date of Patent: Jan. 31, 2017

(54) PROCESSING A FUELING TRANSACTION BASED ON ENTRY OF AN AUTHENTICATOR AT A FUELING PUMP

(71) Applicant: Epona, LLC, Franklin, TN (US)

(72) Inventor: Ernest Betancourt, Lascassas, TN (US)

(73) Assignee: Epona, LLC, Franklin, TN (US)

( * ) Notice: Subject to any disclaimer, the term of this patent is extended or adjusted under 35 U.S.C. 154(b) by 0 days.

(21) Appl. No.: 14/690,681

(22) Filed: Apr. 20, 2015

(65) Prior Publication Data

US 2016/0307185 A1    Oct. 20, 2016

(51) Int. Cl.
*G06Q 20/32* (2012.01)
*G06Q 20/40* (2012.01)
*G06Q 30/02* (2012.01)

(52) U.S. Cl.
CPC .......... *G06Q 20/3278* (2013.01); *G06Q 20/40* (2013.01); *G06Q 30/0213* (2013.01)

(58) Field of Classification Search
None
See application file for complete search history.

(56) References Cited

U.S. PATENT DOCUMENTS

| | | | |
|---|---|---|---|
| 5,671,786 A | 9/1997 | Corfitsen | |
| 5,995,898 A | 11/1999 | Tuttle | |
| 6,024,142 A | 2/2000 | Bates | |
| 6,116,505 A | 9/2000 | Withrow | |
| 6,710,701 B2 | 3/2004 | Leatherman | |
| 6,813,609 B2 * | 11/2004 | Wilson | B67D 7/067 235/380 |
| 7,201,315 B2 | 4/2007 | Symonds et al. | |
| 7,584,885 B1 | 9/2009 | Douglass | |
| 7,912,577 B2 | 3/2011 | Siler | |

(Continued)

FOREIGN PATENT DOCUMENTS

| | | |
|---|---|---|
| DE | 102009030269 A1 | 1/2011 |
| WO | 0140107 A1 | 6/2001 |

OTHER PUBLICATIONS

Turan et al., Performance Criteria for Radio Frequency Identification Technology: Cases of Vehicle Identification Systems in Gas Stations and Automobile Manufacturing, Technology Management fo the Global Future, PICMET 2006, vol. 4, pp. 1647-1656, dated Jul. 9, 2006.

(Continued)

*Primary Examiner* — Daniell L Negron (57) ABSTRACT

A method and system for authenticating and processing a transaction request using a vehicle based wireless system is provided. A vehicle may include a wireless tag or transponder, and a wireless system at a service station or fuel station can detect the presence of the wireless tag in a predefined general wireless service area. The wireless system can transmit vehicle information based on the detection of the wireless tag or vehicle. A user may enter an authenticator at a specific fuel dispenser within the general wireless service area. In response to entry of the authenticator, an authenticator processor may then associate a fueling authorization request with the specific fuel dispenser. In response to successful authorization of the transaction, a transaction authorization may be transmitted to the specific fuel dispenser where the authenticator was presented, which may be used to enable the specific fuel dispenser for use.

19 Claims, 5 Drawing Sheets

(56) References Cited

U.S. PATENT DOCUMENTS

| | | | |
|---|---|---|---|
| 7,938,321 B2 | 5/2011 | Harrell | |
| 8,066,181 B2 | 11/2011 | Bishop et al. | |
| 2001/0001203 A1 | 5/2001 | McCall et al. | |
| 2003/0025600 A1 | 2/2003 | Blanchard | |
| 2004/0217852 A1 | 11/2004 | Kolls | |
| 2007/0106559 A1 | 5/2007 | Harrell | |
| 2011/0100507 A1 | 5/2011 | Weitzhandler et al. | |
| 2013/0254109 A1* | 9/2013 | Beiser | G06Q 20/40 705/44 |
| 2016/0012657 A1* | 1/2016 | Reineccius | G06Q 20/22 705/39 |

OTHER PUBLICATIONS

Porter et al., An RFID-Enabled Road Pricing System for Transportation, Systems, Journal, IEEE, vol. 2:2, pp. 248-257, dated Jun. 2008.

Fu-quin et al., The Study of RFID Reader Pivotal Technology for Circulation Management System of Fuel Gas Automobile Gas Sylinder, Management and Service Science (MASS), 2010 International Conference, pp. 1-4, dated Aug. 24, 2010.

Fioina et al., PeSoV—Pervasive Software-Oriented Vehicles, date unknown, but prior to filing of application.

\* cited by examiner

PROCESSING A FUELING TRANSACTION BASED ON ENTRY OF AN AUTHENTICATOR AT A FUELING PUMP

TECHNICAL FIELD

Aspects described herein generally relate to fueling transactions at a fuel service station. More specifically, aspects relate to processing a fueling transaction for a vehicle based, at least in part, on entry of an authenticator at a fueling pump.

BACKGROUND

The amount of time spent refueling transportation vehicles has a large impact on the cost of transportation, both for vehicle owners and service station owners and operators. Refueling time may vary greatly depending on a variety of factors including required processing time for a fuel sale and/or transaction. Typically, a driver of a transportation vehicle must enter a refueling station, park the vehicle, exit the vehicle, enter authorization and/or payment information for the transaction at a point-of-sale system and wait for approval before starting to refuel.

Vehicle-based radio frequency identification (RFID) tag systems may be deployed to increase the efficiency and throughput of a fueling station. In such systems, tag readers are positioned at each fueling pump of a service station and read vehicle information from tags on or in vehicles that approach the pump for refueling. However, the pumps and service stations at which the tag readers are deployed must be designed with care to ensure that an RFID tag associated with a first vehicle is not inadvertently read during the fueling operation of a second vehicle, resulting in an erroneous assignment of the second vehicle's fuel cost to the first vehicle's tag. Additionally, deployment of RFID tag readers at each fueling pump within a fueling station is expensive, especially if retrofitted or installed after the construction of the fueling pumps and/or the fueling station.

Additionally, consumers remain very price-conscious when it comes to the purchasing of fuel. Recognizing this price-consciousness, many fueling station operators have entered into loyalty agreements with other goods and services providers, such as supermarkets, convenience stores, discount stores, and other retailers. A common implementation is to offer consumers "points" for completing purchases and other transactions within a loyalty agreement network. These "points" may be exchanged at a fueling station for a discount on fuel (usually offered as a percentage or per-unit price reduction). For various reasons, such loyalty programs are usually managed and operated by a retailer other than the fueling station or its operator. For example, a supermarket chain may offer "points" only to consumers that exclusively use the supermarket chain's discount card, and the supermarket chain may only assign "points" to the supermarket chain's card. Another implementation increasing in use is one of "integration," wherein a supermarket or membership-based discount chain may own and/or operate a service station, usually located in the parking lot of the retailer's store. Cost savings are realized by capable management of the distribution and logistical costs of the service station and integrating such costs into the costs of the retailer's primary line of business within the store. Recognizing the price-consciousness of their consumers, these owners and/or operators may desire to "pass on" cost savings achieved through such "integration," but would prefer to do so only to customers who frequently shop at the associated retail store (e.g., are signed up for the retail store's discount program and/or are paying members in the membership-based discount chain).

The discount cards used to deploy these programs are typically unassociated with a payment method, given their simple design and the ease with which they can be misplaced. Therefore, in order to redeem "points," or otherwise authenticate that a user is a member of a membership program and/or loyalty-program, the consumer must present two pieces of information to the fueling station: a loyalty card or membership card, which may contain their redeemable "points," as well as a payment method to actually purchase the desired fuel. This increases the average length of time to complete a loyalty or membership-based transaction, thereby decreasing efficiency.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects described herein, a vehicle may include a wireless tag or transponder, and a wireless system at a fuel service station may detect the presence of the wireless tag in a predefined, but general, wireless service area associated with the fuel service station. The wireless tag or transponder may include or store identifying information associated with the vehicle and/or user of the vehicle. The identifying information may include information used to authorize or pre-authorize a transaction. A transaction may be initiated based on the detection of the wireless tag or transponder within the service station and/or identifying information delivered from the tag by the wireless system. The initiated transaction may be pre-authorized based on the information from the tag, for instance, prior to the arrival of the vehicle at the specific fuel pump.

A user associated with the vehicle may present an authenticator at a specific fuel dispenser within the general wireless service area. In response to presentation of the authenticator at the specific fuel dispenser, an authenticator processor may then associate the initiated transaction or pre-authorized transaction with the specific fuel dispenser. If necessary, information associated with the authenticator and/or the specific fuel dispenser may be used to fill in details missing from the initiated transaction. In response to subsequent authorization of the transaction, a transaction authorization may be transmitted to a point of sale and/or to the specific fuel dispenser where the authenticator was presented, which may be used to enable the specific fuel dispenser for fueling of the vehicle.

These as well as other advantages and aspects are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the claimed subject matter may be practiced. It is to be understood that other embodiments may be utilized and structural and functional modifications may be made without departing from the scope of the present claimed subject matter.

As discussed above, service stations may provide fueling services to vehicles, such as cars, personal and commercial trucks, sport utility vehicles (SUVs) and the like. Users of the fueling services typically present identifying and/or payment information to request and complete a fuel transaction. This information is transmitted to, for example, a payment processor (e.g., credit card payment processor) or other processing system to authorize a transaction. The number of vehicles that can be serviced by the fueling station during a time period is limited, because each user has to get their vehicle to an open pump, present their identifying information, wait for transmission to the processing system, and wait to learn whether the transaction has been authorized or not authorized. The throughput can be further reduced where, for example, the identifying information was entered incorrectly, the payment method was not valid or lacked sufficient funds, and the like.

As discussed herein, instead of waiting for the vehicle to arrive at the pump, a transaction request may be initiated based on identifying information retrieved from a wireless tag or transponder of the vehicle as the vehicle enters a wireless coverage area of the service station or moves to an available fuel pump. This may increase the throughput of the service station, since identifying the vehicle and user and/or obtaining payment information may be performed while the user waits for or moves to an open pump at the service station. The identifying information may be transmitted to a transaction processing system.

Many service stations that provide fueling services to vehicles have multiple fuel pumps; it is not uncommon for large service stations to have a dozen or more fuel pumps. To minimize the time spent at the service station, users typically wait in line for the first-available fuel pump at the service station or in a lane of multiple pumps. Authenticator information may be entered at the chosen fuel pump and transmitted to a transaction processing system and/or authenticator processing device. The authenticator information may be matched and associated with the identifying information retrieved from the wireless in order to authorize the transaction and/or fuel the identified vehicle at the chosen fuel pump.

Figure 1:
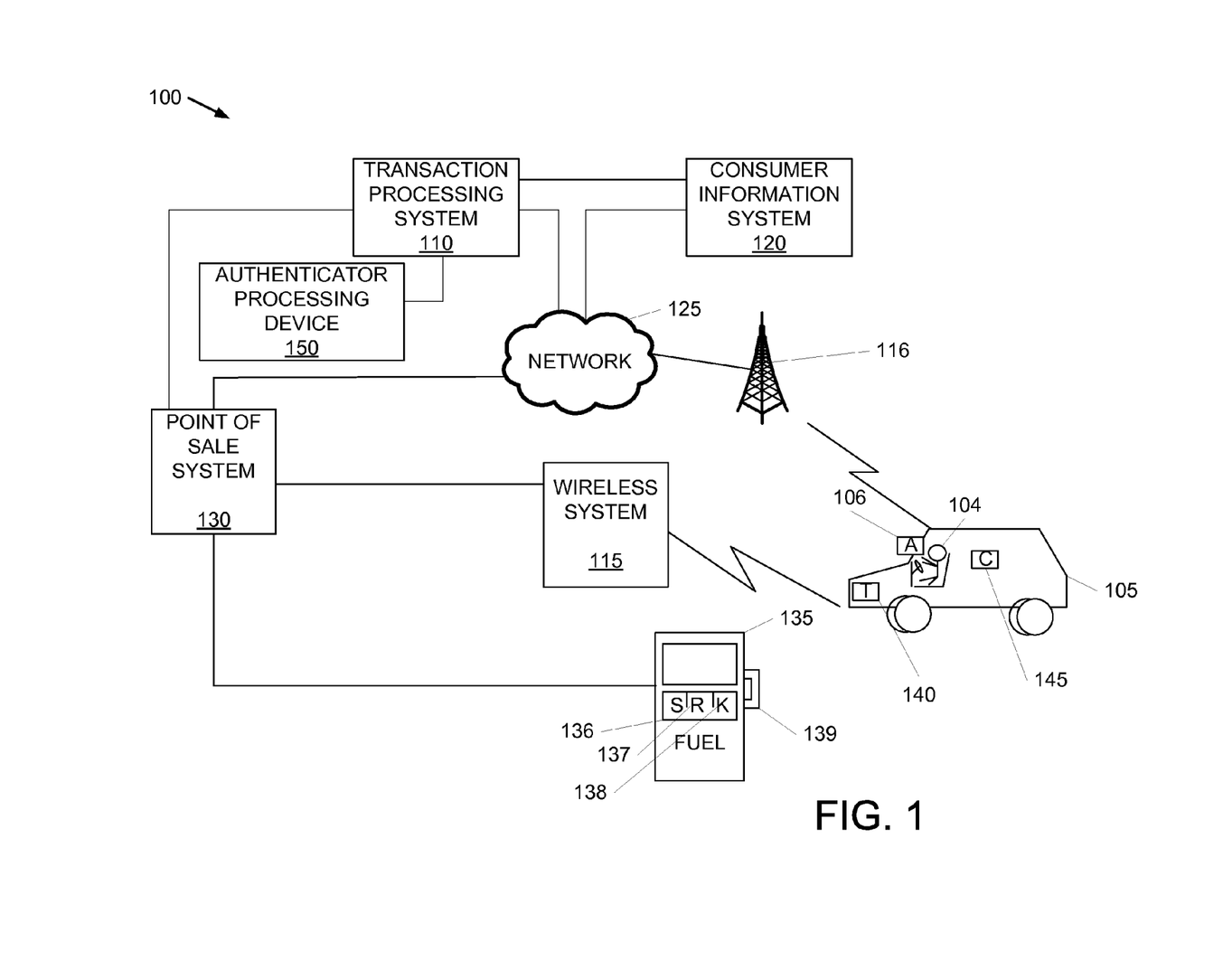
FIG. 1 illustrates a transaction authorization and processing system according to one or more aspects described herein.

FIG. 1 illustrates a transaction processing and authorization system 100 configured to facilitate fueling transactions for transportation vehicles such as vehicle 105. Vehicle 105 may be a variety of different vehicles including, for instance, an automobile, tractor-trailer truck, and the like. Generally, a transaction, such as a fueling transaction, for a transportation vehicle may be between a service station, such as a fuel service station, and a user or driver of the vehicle. However, the transaction may be between another non-driver user, such as a passenger, family member of the vehicle owner, or the like, and the service station.

In some examples, the user may initiate a transaction and provide transaction information through a transaction request. In some conventional arrangements, a fuel transaction may require a driver to exit the interior of the vehicle to enter information for transaction authorization at a point of sale system (e.g., a fuel station, fuel pump, etc.). For example, transaction information may be entered using a keypad at the point of sale system or entered by a cashier at a fuel station counter. This transaction information may include identification information such as name, username, unique identifier, or the like, loyalty card information, and/or payment information. Accordingly, entry of the transaction information via a conventional system may be time consuming and difficult depending on the interface provided at the point of sale.

System 100 described herein may provide a user 104 with the convenience of having some or all of this transaction information or identification information obtained from the vehicle 105 and/or device(s) associated with the vehicle 105. In some examples, the entry of transaction and/or identification information may be provided using a combination of infrastructure at a service station, communication device(s) of or associated with the vehicle, and/or communication networks. The system 100 may include various devices, systems, functionalities, and the like, including, for example, transaction processing system 110, wireless system 115 (e.g., radio frequency identification (RFID) system), user information system 120, point of sale system 130, and fuel dispensing system 135. The system 100 may further include a wireless tag 140, such as a wireless tag or transponder 140, on the vehicle 105, in an interior of the vehicle 105 and/or otherwise physically connected to the vehicle 105.

Communications between the various systems and devices of the environment illustrated in FIG. 1 may be conducted using a variety of communication methods including wired and wireless communication solutions, for instance via network 125. Network 125 may be a wired or wireless communication network. Wired networks, for example, may include wired local area networks (LANs), Internet Protocol (IP) networks, cable networks and/or fiber optic communication networks links. Wireless networks, for example, may include cellular networks (e.g., Global System for Mobile Communications (GSM), Code Division Multiple Access (CDMA), and any other 2nd, 3rd, 4th and higher generation cellular communications), cellular broadband networks, radio access networks, local wireless networks (e.g., Wi-Fi, WiMAX), and/or satellite networks. Transaction processing system 110, wireless system 115, user information system 120, and/or point of sale system 130 may include various computing device components, such as network interfaces, that enable connection and/or communication between the various systems, including, for example, communication of transaction information and/or identification information.

User 104 may possess or have access to an authenticator 106. An authenticator 106 may include one or more pieces of authenticating information or data which may be entered into one or more systems of environment 100 via, for example, scanner 136, reader 137, and/or keypad 138 of fuel dispensing system 135. In some arrangements, the authenticator 106 may be a card or identification number of a card, user, etc. associated with a discount or loyalty program issued by a retailer, such as a supermarket, to user 104 or another person or entity associated with the vehicle 105. In some examples, the authenticator 106 could be based on the user's participation in a warehouse club. For example, the authenticator 106 could be the club card, or number associated with that card, presented for entry into the warehouse club, at checkout at the warehouse club, or the like. In some embodiments, the authenticator 106 might not have a physical form and instead may be a distinctive password, passphrase, or piece of personal information, such as a telephone number, that is unlikely known to non-users of vehicle 105.

A fuel dispensing system 135 may be configured to dispense a quantity of fuel based on a successful initiation and/or authorization of a fuel transaction. Fuel dispensing system 135 may include one or more fuel pumps 139 and/or other mechanisms for physically dispensing the requested fuel. Fuel dispensing system 135 may also include, in some examples, a device or devices capable of data entry or receiving input from a user, such as a scanner 136, reader 137, and/or keypad 138. In some embodiments, scanner 136 may be an optical scanner capable of reading one-dimensional and/or two-dimensional barcodes, quick response (QR) codes, and the like. In some arrangements, reader 137 may be a magnetic stripe reader capable of reading identification and/or payment cards including a magnetic stripe.

The fuel dispensing system 135 may communicate with a transaction processing system 110 and/or a point of sale system 130 to determine whether to dispense fuel (e.g., initiate and/or authorize a fuel transaction). A point of sale system 130 may include, in some examples, hardware and/or software configured for processing fuel transactions (e.g., initializing and completing fuel sale transactions) and other sales transactions, such as transactions for goods sold by a service station (e.g., food, drinks, tobacco products, vehicle accessories, and the like) or services rendered at the service station (e.g., car washes, oil or tire changes, tune-ups, and the like). Point of sale systems 130 may process different types of transactions using different types of authorization and payment methods. For example, point of sale system 130 may process a credit card or debit card payment method by contacting or connecting to a credit card processor (either directly and/or via transaction processing system 110). As another example, point of sale system 130 may process an authenticator 106 by contacting customer information system 120 and/or a data store and determining if the user of the authenticator 106 is entitled to a discount on fuel, goods, and/or services.

A transaction processing system 110 may include, in some examples, hardware and/or software configured for further processing of fuel transactions (e.g., initializing, authorizing and/or completing fuel sale transactions) conducted at one or more service stations by one or more point of sale systems 130. The hardware and/or software of point of sale system 130 may be configured to communicate part and/or all of the information of a fuel transaction to the transaction processing system 110, and an individual fuel transaction may be processed by one or both of the transaction processing system 110 and the point of sale system 130. For example, the point of sale system may process parts of a fuel transaction prior to, concurrently with, and/or after processing of other parts of the fuel transaction by the transaction processing system 110.

In some arrangements, the point of sale system 130 may receive transaction and/or identification information about the vehicle 105 and/or user 104 (e.g., from wireless system 115 and/or fuel dispensing system 135) and prepare and/or transmit the transaction and/or identification information to the transaction processing system 110 for further processing of the information, including pre-authorizing a fuel transaction based on the received transaction/identification information. In some arrangements, the point of sale system 130 may receive a pre-authorized fuel transaction from the transaction processing system 110 associated with a vehicle 105 and/or user 104. The pre-authorized fuel transaction may be received by the point of sale system 130 from the transaction processing system 110 based on knowledge and/or a prediction that the vehicle 105 may be currently located at a service station associated with the point of sale system 130 and/or will be located at the service station at a future point in time (e.g., the vehicle 105 is currently en route to the service station). Based on the receipt of the pre-authorized fuel transaction, point of sale system 130 may communicate to wireless system 115 and/or fuel dispensing system 135 information associated with vehicle 105 and/or user 104 (e.g. values associated with authenticator 106).

Present in the transaction processing and authentication system of FIG. 1 is one or more wireless systems 115, which are configurable to facilitate communication to, from, and/or between the point of sale system 130 and components of the vehicle 105, such as wireless tag 140. Additionally, the one or more wireless systems 115 may be configurable to facilitate communication to, from, and/or between the point of sale system 130 and a communication device 145 held and/or operated by the user 104.

For example, the wireless system 115 may be a RFID-capable system including one or more RFID readers (not shown in FIG. 1) each capable of reading one or more RFID tags, which may be the wireless tags 140. The wireless tags 140 may be passive and/or active RFID tags. In other examples, the wireless system may utilize one or more wireless tags 140 that are configured to be passively read by one or more interrogating devices of wireless systems 115 once the wireless tags 140 are in communication range of the interrogating devices. Additionally or alternatively, the wireless tags 140 may be configured to actively transmit a signal to one or more receiving devices of wireless system 115, either in response to a request by the receiving devices, on a scheduled basis, and/or entry of the one or more wireless tags 140 into an area bounded by a virtual geo-fence, which may be known by or communicated to the wireless tags 140. The reader(s) of wireless system 115 may be located at one or more general locations at a service station or at a fuel station. These general locations may include, for example, between fuel pumps, in a canopy above the fuel pumps, and/or at the entry/exit points from the fuel station.

In some arrangements, vehicle 105 (or user 104 thereof) may include or be associated with a communication device 145, which is capable of communicating with the wireless system 115 and/or with wireless tag 140. For example, the communication device 145 may be a Bluetooth enabled device, near field communication (NFC) connection enabled device, infrared (IR) device, or Wi-Fi enabled device configured to communicate with the wireless tag 140. The wireless tag 140 and/or the communication device 145 may also communicate or be configured to communicate through wired interfaces. The communication device 145 and/or wireless tag 140 may further be configured to communicate with other devices or systems such as the transaction processing system 110 and user information system 120 via a communication network 125 via a communication link 116. Communication device 145 may, in some arrangements, be a cell phone, smart phone, tablet, or the like.

The transaction processing system 110 may also be connected to or in communication with various other systems and/or devices, such as a user information system 120 and/or authenticator processing device 150. In particular, in one example, the transaction processing system 110 may communicate with user information system 120 to access data stored therein while verifying and authorizing transaction requests. User information system 120 may include one or more systems, databases and/or devices corresponding to users and vehicles. For example, user information system 120 may include systems and databases operated and maintained by, for example, a retailing organization or company which has one or more loyalty or subscriber programs to which the user 104 belongs. User information system 120 may include a database storing user information. For example, user information system 120 may store and maintain user data such as name, address, phone numbers, e-mail addresses, important dates (e.g., birthday, anniversary), payment information, membership status, membership program information, collected loyalty points, and the like. The user information system 120 may, additionally or alternatively, include a database storing information about vehicles associated with users. For example, a user information system 120 may store and maintain vehicle data for a user relating to vehicle makes, models, colors, registration information, license plates, vehicle-specific payment information and the like associated with the user. User information system 120 may further receive data and/or input from various sources including the wireless tag 140 of vehicle 105, a user 104, the other systems present in the transaction processing and authentication environment 100, and/or third-party data providers. User 104 may operate a communication device, (e.g., computer terminal, smartphone, or communication device 145) to update and/or submit data to user information system 120 using a wired or wireless connection. Such data may include the vehicle or vehicles connected to a particular authenticator. In some embodiments, user information system 120 is optional, and data which may have been stored therein may be stored elsewhere within the transaction processing and authentication environment 100.

The user information system 120 may also maintain and/or store information pertaining to authenticators, such as authenticator 106. An authenticator may be in a one-to-one mapping with a user and/or vehicle, for example, where a single user operates or is associated with a single vehicle. Additionally, an authenticator may be in other mappings with users and/or vehicles, where a single user uses an authenticator 106 for multiple vehicles and/or where multiple users use an authenticator 106 (or multiple authenticators 106) for a vehicle or set of vehicles (e.g., a multiple-person household account, a corporate fleet account).

In some arrangements, mappings between an authenticator and a specific user are optional. For example, a corporate entity may maintain a motor pool where different users drive different vehicles at different times. Recordation of which specific individual users are associated with the vehicle may not be necessary for fueling purposes, as it is the entity that maintains the motor pool that is responsible for payment of fueling the vehicles, and may be impractical, because of the frequency of changes in the user. The corporate entity may issue authenticators 106 that are associated with a vehicle account identification number corresponding to a vehicle account. The vehicle account information in the user information system 120 may include a payment method associated with one or more vehicles of the motor pool.

The transaction processing system 110 may include, or be configured to connect to, an authenticator processing device 150. The authenticator processing device 150 may compare information associated with an authenticator 106 with information associated with wireless tags 140. The information associated with the authenticator and/or the information associated with wireless tags 140 may be derived from or stored by user information system 120.

Figure 2:
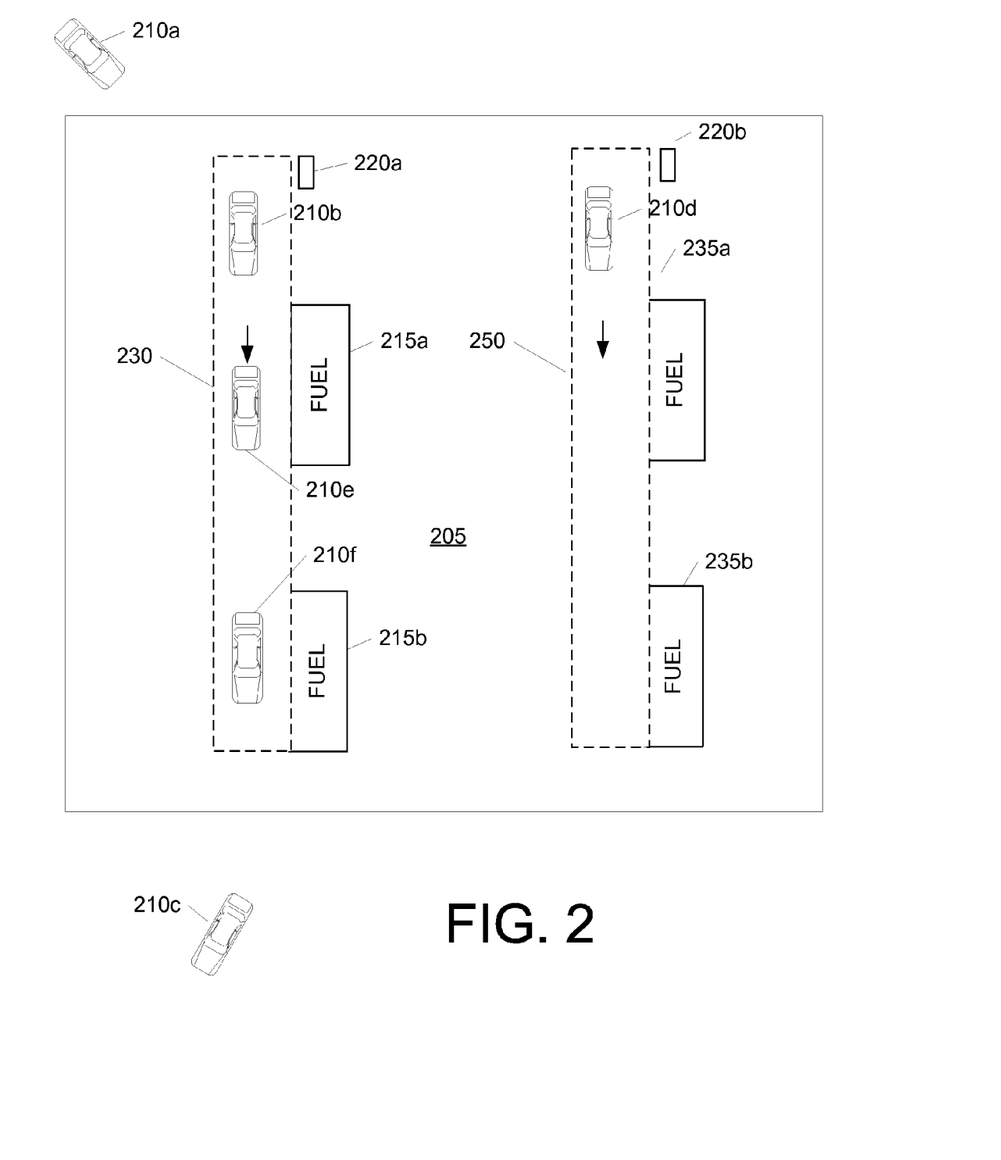
FIG. 2 illustrates a service station environment according to one or more aspects described herein.

FIG. 2 illustrates a service station 205 in which the entry and exit of vehicles from the station and predefined service areas thereof may be detected. Service station 205 may provide fueling services in addition to other user and vehicle services. Service station 205 may include a plurality of fuel pumps 215 and 235. These fuel pumps may be fuel dispensing systems (e.g., 135 in FIG. 1) and/or point of sale systems (e.g., 130 in FIG. 1). The plurality of fuel pumps may be arranged into one or more fuel lanes 230 and 250. One or more sensors 220 may be configured to detect the entry of a vehicle, such as vehicles 210b and 210d, into the service station 205. Sensors 220 may be wireless readers of a wireless system 115 (such as RFID readers of a wireless RFID system) and configured to detect wireless tags and/or communication devices such as wireless tags 140 and/or communication devices 145. In some arrangements, the sensors are arranged or programmed to detect the entry of a vehicle into the service station 205. In other embodiments, sensors may be arranged or programmed to detect the entry of a vehicle more granularly, for example the entry of a vehicle into a particular fueling lane, such as fueling lanes 230 and 250. In some arrangements, the sensors may be positioned such that their coverage areas are coterminous with the physical boundaries of the service station and/or a fueling lane at the service station, as the case may be.

A vehicle's arrival and/or presence within the service station 205 or in a particular fueling lane 230 may be detected using various sensors, short-range sensors and communication devices such as RFID readers and RFID tags, BLUETOOTH enabled devices, short-range Wi-Fi devices and the like. For example, a user or a vehicle may include one or more wireless tags associated with the vehicle and storing identification information. The wireless tags may be read by a reader once the tags are within a specified proximity of the reader. Accordingly, a service station 205 may control and/or enable transactions and the activation/deactivation of service systems based on whether the vehicle or user is within the predefined service area. The short-range sensors 220 may be part of a wireless system (e.g., wireless system 115 in FIG. 1), and may be for example, RFID readers capable of detecting the presence of a RFID tag (e.g., wireless tag 140).

As can be appreciated with reference to FIG. 2, the arrangement of fueling pumps in fueling lanes may create situations, especially during periods of greater activity, in which it is unknown which fueling pump in a fueling lane will be utilized to fuel a vehicle. For example, vehicle 210b may enter the fueling station 205 and queue for the fueling pumps in fueling lane 230. The vehicle 210b may include a wireless tag 140 and a communication device 145, as shown in vehicle 105 of FIG. 1. At the time vehicle 210b enters the fueling station, other vehicles may be occupying both fueling pumps 215a and 215b. The vehicle 210e being fueled at fueling pump 215a may complete fueling and exit the service station 205 before the vehicle 210*f* being fueled at fueling pump 215*b*. Of course, the reverse may occur, creating an opening for vehicle 210*b* at fueling pump 215*b*. Waiting for the vehicle 210*b* to arrive at the specific fueling pump before initiating a transaction reduces efficiency in terms of station throughput, especially if information about the vehicle may be obtainable by sensors 220 from the moment of vehicle's 210*b* entry into service station 205 or fueling lane 230.

Accordingly, as discussed herein, the transaction processing system 110 and/or point of sale system 130 may receive from the wireless system 115 (e.g., from a wireless tag of the vehicle) information about the presence of the vehicle 210*b* at the service station 205 as it passes in range of sensor 220*a*. The information may further include transaction or payment information. While the user of the vehicle waits for an open pump among 215*a* and 215*b*, the transaction processing system 110 and/or point of sale system 130 may process the information associated with the vehicle 210*b* to initiate a fuel transaction (e.g., determine a payment method associated with the vehicle 210*b*, contact a payment processor associated with the payment method, determine a maximum quantity of fuel to be dispensed based on payment method and/or previous transactions, and the like). Once either fuel pump 215*a* or 215*b* becomes available to vehicle 210*b*, the user can position the vehicle 210*b* for fueling at the available pump and enter an authenticator 106 at the selected pump. As discussed above, the authenticator may include, for example, an identification number of a user associated with a loyalty program, warehouse club membership, or the like.

Point of sale system 130 and/or transaction processing system 110 may detect the entry of the authenticator at the selected fuel pump and, upon a determination that the authenticator is associated with the vehicle and/or the initiated fuel transaction, (e.g., by authenticator processing device 150), may authorize the transaction and communicate, to the selected fuel pump, to dispense fuel according to the initiated and authorized fuel transaction.

Figure 3:
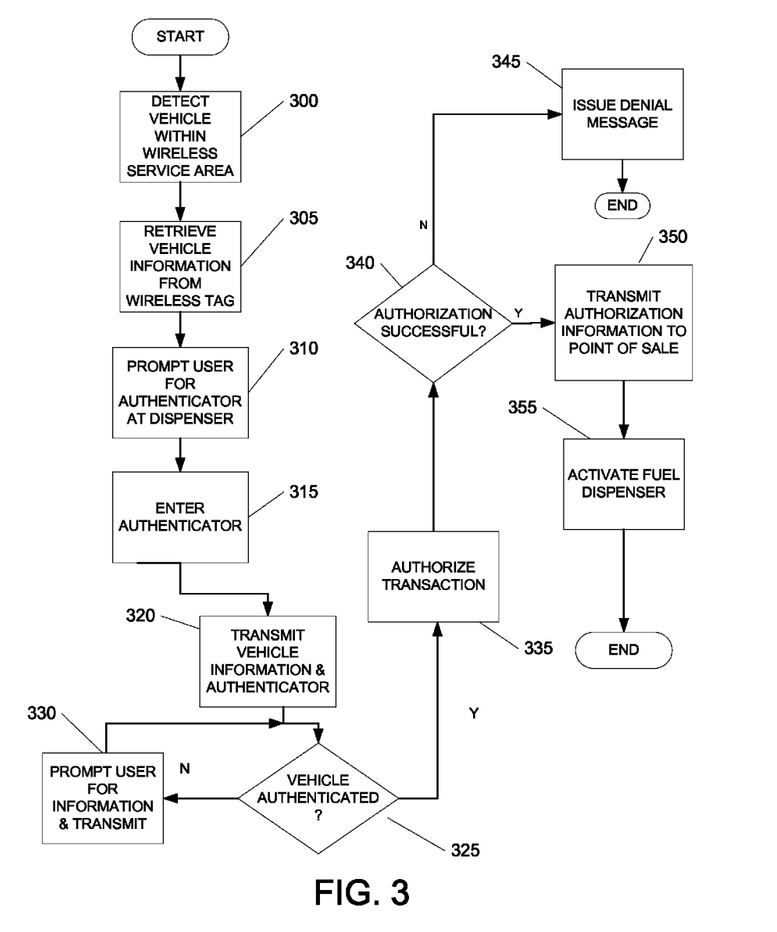
FIG. 3 is a flowchart illustrating a method for authorization and processing vehicle transaction requests according to one or more aspects described herein.

FIG. 3 is an illustrative flowchart of a method for initiating a vehicle transaction request, such as a fueling request. In step 300, a vehicle's entry into a predefined wireless service area associated with a particular fueling and/or service station may be detected. In some embodiments, the wireless service area may be a single fueling lane (such as fueling lane 230 of FIG. 2) of fueling pumps in a multi-lane fueling station 205. In other embodiments, multiple lanes of a fueling station may be covered by a single predefined wireless service area. The predefined wireless service area may be the coverage area of a wireless reader of a wireless system, such as RFID readers in a RFID system.

In step 305, in response to detecting the entry of the vehicle into the wireless service area, identification and/or transaction information may be retrieved or otherwise obtained from wireless tag 140 and/or communication device 145. Identification/transaction information may include information regarding vehicle 105 and/or user 104, and may include information sufficient to look up additional information regarding vehicle 105 and/or user 104 from, e.g., the user information system 120. Wireless tag 140 and/or communication device 145 may store the identification information in a locally-attached memory. Upon the vehicle's 105 entry into the predefined wireless service area, the wireless tag 140 and/or communication device 145 may be interrogated by one or more readers or devices servicing the wireless service area. In some arrangements, the wireless tag 140 and/or the communication device 145 may be prompted by the wireless service area reader(s) and/or device(s) to transmit or otherwise provide the identification information instead of having the information be passively read by the reader(s) and/or device(s). In some arrangements, the wireless tag 140 and/or the communication device 145 may transmit or otherwise provide the identification information without prompting or interrogation, for example based on a geographic position of the wireless tag 140 and/or the communication device 145. Wireless tag 140 and/or communication device 145 may provide the identification and/or transaction information from the internal memory of the wireless tag 140 and/or communication device 145. For example, wireless tag 140 and/or communication device 145 may provide an identification number associated with the vehicle, which can then be used as a key to find information such as payment information for use during transactions that was previously stored in user information system 120.

In some arrangements, the transaction processing system 110 and/or point of sale system 130 may initiate a transaction based on the identification/transaction information, which may include one or more steps such as determining a payment method associated with the vehicle, contacting a payment processor associated with the payment method, determining a maximum quantity of fuel to be dispensed based on payment method and/or previous transactions, and the like. In some arrangements, the identification information and/or information obtained from the user information system 120 may comprise the data necessary for an authorization processor to determine whether to pre-authorize a fueling transaction. Pre-authorizing the fueling transaction may be performed without identification of a specific pump to be used to fuel the vehicle. For instance, a transaction may be initiated and pre-authorized based on information received from the wireless tag associated with the vehicle and/or retrieved based on that information. However, the transaction might not be authorized until a particular fuel pump is identified (e.g., by receipt of authenticator at the specific fuel pump to be used).

In step 310, unoccupied fueling pumps in lane 230 or in service station 205 may operate to await the entry of an authenticator at an individual fueling pump in lane 230 or in service station 205. For example, fueling pumps in lane 230 may, if otherwise unoccupied, display on an associated fuel pump display a prompt to a user to present or enter their authenticator.

In step 315, the user presents or enters their authenticator to a specific fueling pump in service station 205. As discussed above, an authenticator may be scanned by scanner 136, read by reader 137, and/or keyed in by a user using keypad 138. For example, in some embodiments where the authenticator includes a physical card indicating membership in a warehouse club and/or used for entry into a warehouse club, the user may present the card (or bar code or other machine-readable code located thereon) to be scanned by scanner 136 and/or read by reader 137. In other examples, for example where the authenticator does not have a physical form, the authenticator may be a distinctive password, passphrase, or piece of personal information, such as a telephone number. In those examples, the user may enter the authenticator into the system, such as via a keypad (such as keypad 138 in FIG. 1).

In step 320, the identifying information retrieved from wireless tag 140 and/or the communication device 145 and the authenticator 106, or information associated with therewith, presented at the fuel dispenser are transmitted to the authenticator processing device. In some embodiments, however, the identifying information obtained from the wireless tag 140 and/or communication device 145 may have already been transmitted to the authenticator processor prior to the entry of the authenticator (for example, as part of step 310 during the obtaining of the identifying information and/or upon initiating the fuel transaction).

As discussed above, the authenticator processing device may operate to compare information associated with the authenticator with identification/transaction information associated with vehicle tags identified as being within the proximity of the sensors of the service station 205 generally or, in some embodiments, in a specific fueling lane 230. In step 325, the authenticator processing device and/or the user information system may attempt to match the identification information obtained from the devices associated with the vehicle present in the service station (e.g., the wireless tag and/or the communication device) to the received authenticator, based on the receipt of the authenticator at a specific fuel dispenser. The process of matching identification/transaction information and authenticators may include a variety of steps, including verifying the authenticator presented at the fuel dispenser.

If, in step 325, a match is found between the information received from a vehicle tag present in the service station and a vehicle associated with the authenticator at a particular fuel pump, the vehicle is authenticated and the system proceeds to various steps regarding authorizing the transaction previously initiated by the detection of the wireless tag at the service station. This may include associating the initiated transaction with the authenticator and/or the specific fuel pump where the authenticator was received so that transaction may be authorized and the specific fuel pump may complete the transaction (e.g., dispense the fuel, record the quantity of fuel stored). If a match is found between the vehicle at the fueling station and/or fueling lane and the authenticator entered at a specific fueling pump at the fueling station and/or fueling lane, the authenticator processing device may transmit an authorization request to the transaction processing system 110.

If, however, the authenticator processing device is unable to determine that a vehicle associated with an authenticator is present at the service station, the system may proceed to step 330 and issue a prompt to a display of the fueling pump for additional input from the user. A vehicle may be unable to be authenticated for a variety of reasons. For example, it may be that the user of the authenticator has failed to previously associate the vehicle driven to the service station with the authenticator. As another example, it may be that the wireless system is unable to read the wireless tag of the vehicle because of technical problems such as interference and/or equipment failures. Thus, in step 330, additional prompts may be issued to a display of the fueling pump to solicit enough information to retrieve a vehicle account or consumer account, based upon entry of the authenticator alone. One or more prompts may direct the driver to reenter the previously presented authenticator. One or more prompts may direct the driver to provide other information, such as a username, passcode, zip code, telephone number, and the like, which may be alternative authenticators to be used if a first authenticator is unable to be entered, or does not result in a match. Entry of this additional information may result in new or revised requests and/or transmissions to the authenticator processing device to associate a vehicle with the information entered by the user operating the specific fueling pump (in other words, the process may loop back to step 325). Repeated failures to associate a vehicle present in the service station with the authenticator presented by the user may result in the issuance of notifications to point of sale system 130 for operator action and/or override as necessary.

Responsive to the vehicle being authenticated in step 325, in step 335, the fuel authorization system 110 and/or the user information system 120 may authorize the initiated transaction. The process of transaction authorization may include a variety of steps including verifying the identification information of the user requesting the transaction and determining whether the identified user has sufficient funds or credit to pay for the transaction.

If, in step 340, a determination is made that the transaction is not authorized (e.g., the authorization was unsuccessful), a denial indication or message may be transmitted to the user in step 345. In one or more instances, a denial message may include an opportunity for the user to revise the transaction request and/or related information. The denial message may be presented on the display of the pump and provide the user with the opportunity to re-enter, revise, and/or re-submit transaction information for transaction authorization. An option of canceling the transaction request may also be presented on a display of the fueling pump. The denial message may be transmitted to the display from the transaction processing system 110 and/or user information system 120 through a wireless network. In some arrangements, the denial message may be transmitted or through another communication interface to the communication device 145.

If the transaction was authorized in step 340, the transaction processing system 110 may process the payment method for the transaction and transmit a transaction authorization to the point of sale system 130 in step 350. Alternatively, the transaction processing system 110 may transmit a transaction authorization to the point of sale 130, and direct the point of sale system 130 to process the payment method for the transaction.

In step 355, the point of sale system 130 may activate the fuel station or pump indicated in the location information determined by the wireless system 115 to enable dispensing of fuel for the vehicle in response to receiving authorization or approval of the transaction. The point of sale system 130 may activate the fuel pump to dispense only an specified amount of fuel, or the point of sale system 130 may allow an unlimited quantity of fuel to be dispensed (e.g., a fill-up). The point of sale system 130 may also communicate a confirmation of the transaction authorization to the communication device 145 through, for example the wireless system 115. Once the transaction is completed, completed transaction information may be transmitted to the through the wireless tag 140 or through a wireless network from the point of sale system 130. The point of sale system 130 and/or the transaction processing system 110 may update the transaction with the quantity of fuel actually dispensed, as necessary (e.g., the user dispensed only a portion of the authorized amount).

Figure 4:
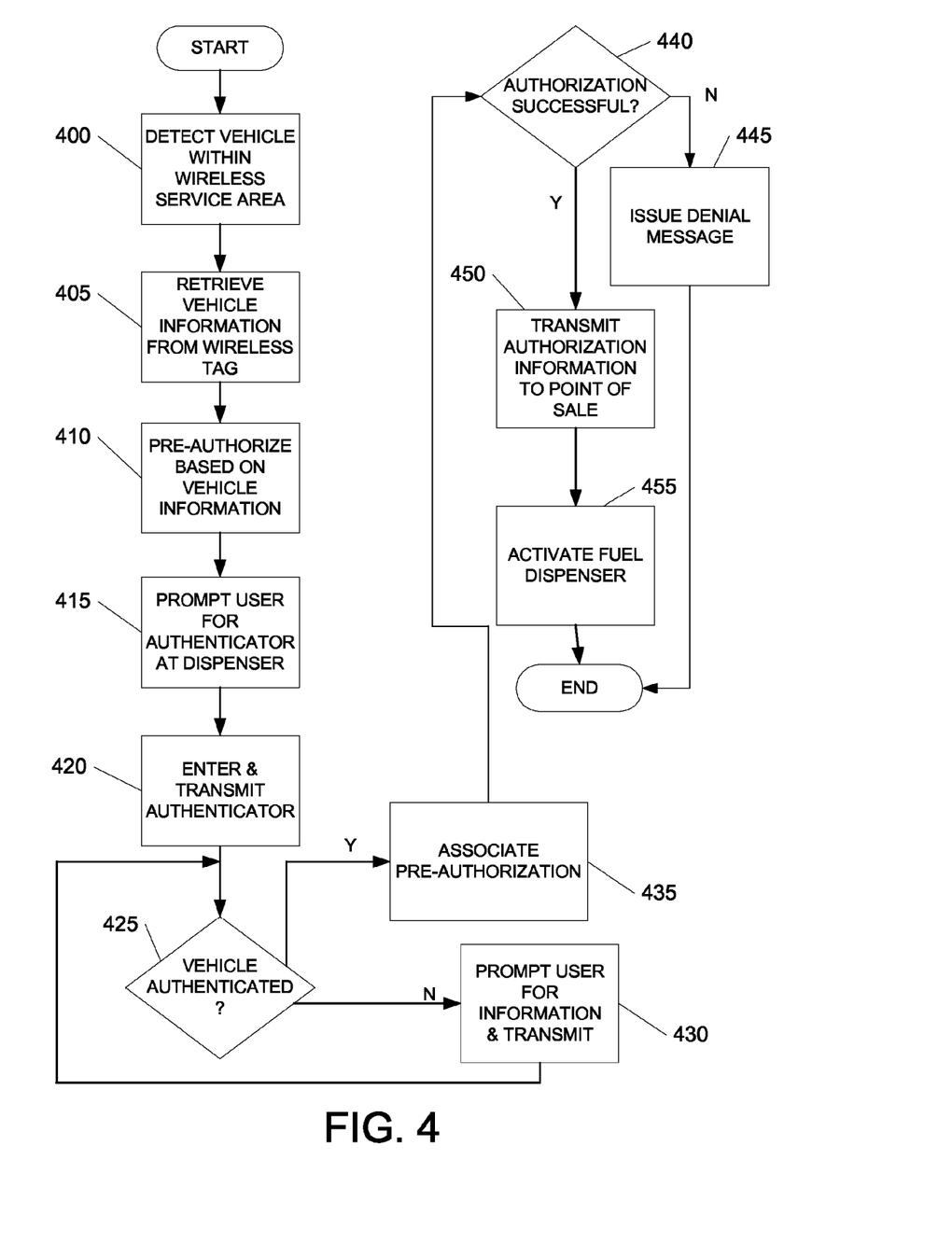
FIG. 4 is a flowchart illustrating another method for authorization and processing vehicle transaction requests according to one or more aspects described herein.

FIG. 4 is another illustrative flowchart of a method for initiating a vehicle transaction request, such as a fueling request. In the example shown in FIG. 4, the identification/transaction information obtained from the wireless tag is sufficient to pre-authorize the transaction independent from the authentication of the vehicle and/or user. For example, this method may be used where knowledge of the specific fueling pump at which the vehicle will be fueled is not required by the transaction processing system for the pre-authorization of the transaction.

In step 400, a vehicle's entry into a predefined wireless service area associated with a particular fueling and/or service station may be detected. In some embodiments, the wireless service area may be a single fueling lane (such as fueling lane 230 of FIG. 2) of fueling pumps in a multi-lane fueling station 205. In other embodiments, multiple lanes of a fueling station may be covered by a single predefined wireless service area. The predefined wireless service area may be the coverage area of a wireless reader of a wireless system, such as RFID readers in a RFID system.

In step 405, in response to detecting the entry of the vehicle into the wireless service area, identification and/or transaction information may be retrieved or otherwise obtained from wireless tag 140 and/or communication device 145 associated with the vehicle 105. Identification/transaction information may include information regarding vehicle and/or user, and may include information sufficient to look up additional information regarding vehicle and/or user 104 from, for example, the user information system. Wireless tag 140 and/or communication device 145 may store the identification information in a memory, for example a locally-attached memory. Upon the vehicle's 105 entry into the predefined wireless service area, the wireless tag 140 and/or communication device 145 may be interrogated by one or more readers or devices servicing the wireless service area. In some arrangements, the wireless tag 140 and/or the communication device 145 may be prompted by the wireless service area reader(s) and/or device(s) to transmit or otherwise provide the identification information instead of having the information be passively read by the reader(s) and/or device(s). Wireless tag 140 and/or communication device 145 may provide the identification information from the internal memory of the wireless tag 140 and/or communication device 145. For example, RFID tag 140 and/or communication device 145 may transmit a vehicle identification number, which can then be used as a key to find information such as payment information previously stored in user information system 120. In some embodiments, the identification information and/or information obtained from the user information system 120, may comprise the data elements necessary for an authorization processor to determine whether to authorize a fueling transaction.

In step 410, the transaction processing system 110, point of sale system 130 and/or the user information system 120 pre-authorizes the requested/initiated transaction. A fuel pump may not be associated with the pre-authorized transaction, because the specific fuel pump to be used to fulfill the transaction is not yet known. The process of transaction pre-authorization may include a variety of steps including verifying the identification information of the driver requesting transaction authorization and verifying whether an identified user has sufficient funds or credit to pay for the transaction. The resulting pre-authorized transaction is stored, pending the association of the transaction with a specific fueling pump. The pre-authorization may have been successful or not successful, depending on the validity and/or completeness of the identifying information delivered to the transaction processing system 110, point of sale system 130, and/or the user information system 120 from the wireless tag.

In step 415, unoccupied fueling pumps in lane 230 or in service station 205 may operate to await the entry of an authenticator at an individual fueling pump in lane 230 or in service station 205. For example, fueling pumps in lane 230 may, if otherwise unoccupied, may display on an associated display a prompt to a user to present or enter their authenticator.

In step 420, the user presents or enters their authenticator to a specific fueling pump in service station 205 so that the pre-authorized transaction may be retrieved and associated with the specific fueling pump. As discussed above, an authenticator may be scanned by scanner 136, readable by reader 137, and/or keyable using keypad 138. For example, in some embodiments where the authenticator is a physical card indicating membership in a warehouse club and/or entry into a warehouse club, the user may present the card (or bar code or other machine-readable code located thereon) to be scanned by scanner 136 and/or by read by reader 137. The user may also input an identifier associated with the loyalty program or warehouse club membership as an authenticator. In other examples, for example where the authenticator does not have a physical form, the authenticator may be a distinctive password, passphrase, or piece of personal information, such as a telephone number. In those examples, the user may enter the authenticator into the system, such as via a keypad (such as keypad 138 in FIG. 1).

In step 420, information retrieved via the authenticator 106, or information associated therewith, presented at the fuel dispenser are transmitted to the authenticator processing device. In step 425, the authenticator processing device and/or the user information system attempts to match a pre-authorized transaction (whether successful or not successful) for vehicles present in the service station based on the entry of an authenticator at a specific service station. The process of associating transactions and authenticators may include a variety of steps, including verifying the authenticator information presented at the fuel dispenser.

The authenticator processor may compare the pre-authorized transactions for vehicles present in the fueling station or in a fueling lane (that is, the wireless tags read by the wireless reader upon the entry of the tags into the service station) with the information regarding the user and/or vehicle(s) connected to the authenticator. If, in step 425, a match is found between a pre-authorized transaction and the information obtained from the authenticator, the system proceeds to associating the pre-authorized transaction with the authenticator information. In step 435, if a match is found between a pre-authorized transaction and information obtained from an authenticator in step 425, the authenticator processor may associate the pending transaction with the specific fuel pump, and transmit the association to the fuel authorization system 110.

If, however, the authenticator processing device is unable to determine that a vehicle associated with an authenticator is present in the service station in step 425, the system may proceed to step 430 and issue a prompt to a display of the fueling pump for additional input from the user. A pre-authorized transaction may be unable to be associated with an authenticator for a variety of reasons. For example, it may be that the user of the authenticator has failed to previously associate the vehicle driven to the service station with the authenticator. Thus, in step 430, additional prompts may be issued to a display of the fueling pump to solicit additional information for possible matching of an pre-authorized transaction. One or more prompts may direct the driver to reenter the previously presented authenticator. One or more prompts may direct the driver to provide other information, such as a username, passcode, zip code, telephone number, and the like, which may be alternative authenticators to be used if a first authenticator is unable to be entered, or does not result in a match. Entry of this additional information may result in new or revised requests and/or transmissions to the authenticator processing device to associate a vehicle with the information entered by the user operating the specific fueling pump (in other words, the process may loop back to step 425). Repeated failures to associate a vehicle present in the service station with the authenticator presented by the user may result in the issuance of notifications to point of sale system 130 for operator action and/or override as necessary.

In step 435, the previously stored pre-authorized transaction is retrieved and associated with the authenticator (or information pertaining to the authenticator), as necessary. Further action based on the result of the pre-authorization (i.e. successful or not successful pre-authorization) may now be taken, as the authenticator and pre-authorized transaction are associated. For example, if the pre-authorization was unsuccessful because of problems determining identification information, information obtained during the authentication steps (e.g., steps 415, 420, 425, and 430) may be used without further interaction with the user. This may start or restart the pre-authorization steps as necessary.

In step 440, a determination is made that the transaction is authorized, based on the previously stored pre-authorized transaction and the matching of pre-authorization with the authenticator. If, in step 440, a determination is made that the pre-authorization and/or a subsequent pre-authorization (i.e. using the information obtained during the authentication steps) was not successful, a denial indication or message may be transmitted to the user in step 445. In one or more instances, a denial message may include an opportunity for the user to revise the transaction request and/or related information. The denial message may be presented on the display of the pump and provide the user with the opportunity to re-enter, revise, and/or re-submit information for transaction authorization. An option of canceling the transaction authorization request may also be presented on a display of the fuel dispensing system 135. The denial message may be transmitted to the display from the transaction processing system 110 and/or user information system 120 through a wireless network or through another communication interface, and in some embodiments may be transmitted to the communication device 145 instead or in addition to the display of the fuel pump.

If the transaction was determined to be successfully authorized in step 440, the transaction processing system 110 may transmit a transaction authorization to the point of sale system 130 in step 450 and process a payment method associated with the transaction. Alternatively, the transaction processing system 110 may transmit transaction authorization to the point of sale system 130, and direct the point of sale system 130 to process the payment method associated with the transaction.

In step 455, the point of sale system 130 may activate the fuel pump indicated in the location information determined by the wireless system 115 to enable dispensing of fuel for the vehicle. The point of sale system 130 may activate the fuel pump to dispense an specific or unlimited amount of fuel based on the transaction authorization. The point of sale 130 may also communicate a confirmation of the transaction authorization to the communication device 145 through the wireless system 115, display the confirmation to the user via a display of the fuel pump, and/or store the confirmation in the user information system 120.

Figure 5:
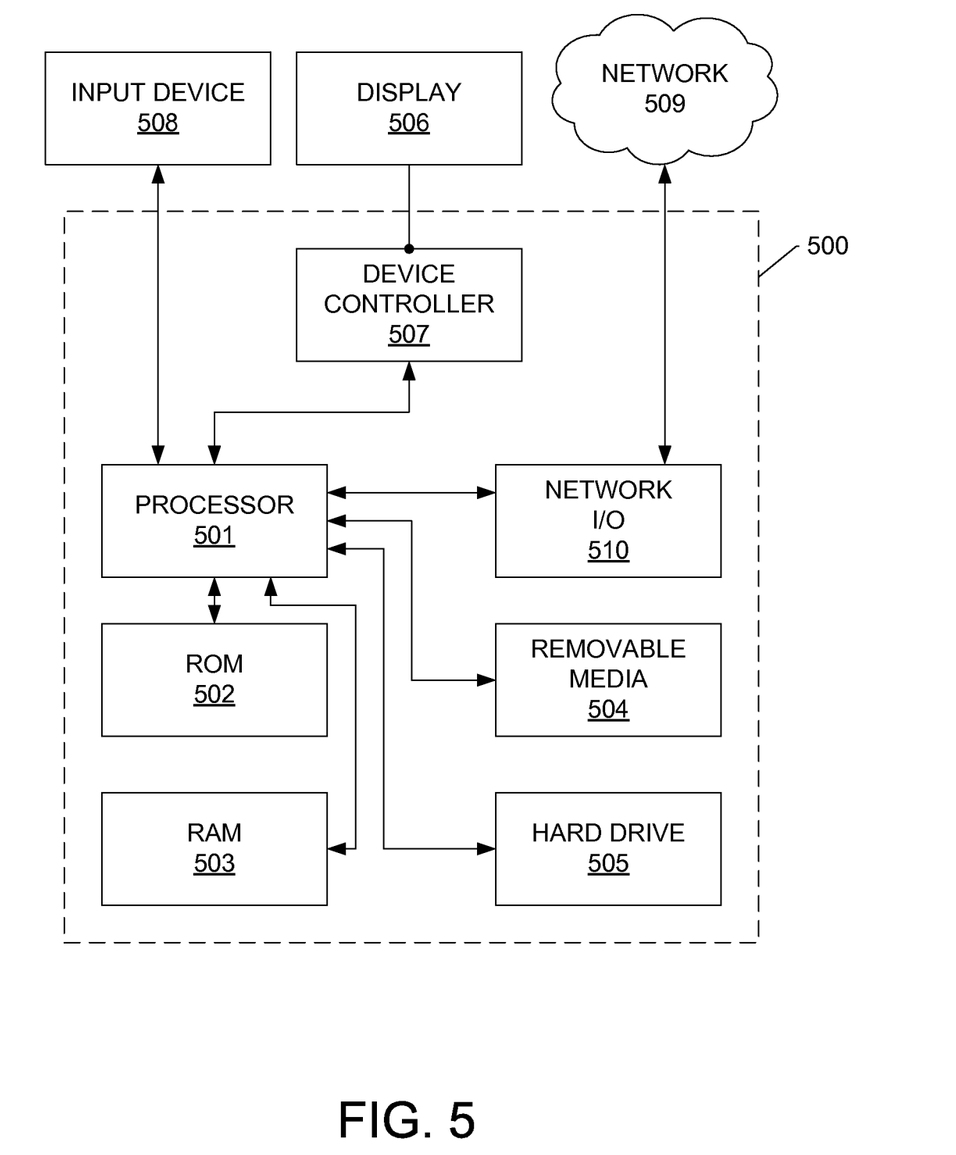
FIG. 5 illustrates an example computing system or device on which various elements described herein can be implemented.

FIG. 5 illustrates a general computing device or system that can be used to implement any of the various arrangements discussed herein, including those of transaction processing and authorization system 100 and service station environment 200. Device 500 may include one or more processors 501, which may execute instructions of a computer program to perform any of the functions and steps described herein. The instructions may be stored in any type of non-transitory computer-readable medium or memory to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), hard drive, floppy disk drive, or any other desired electronic storage medium. Instructions may also be stored in hard drive 505, which may be an internal or external hard drive.

Device 500 may include one or more output devices, such as a display 506 (e.g., an external monitor or television), and may include one or more output device controllers 507, such as a video processor. In some embodiments, device 500 may include one or more user input devices 508, such as a remote control, keyboard, mouse, touch screen, microphone, or any other input device.

Device 500 may also include one or more network interfaces, such as network input/output (I/O) interface 510 to communicate with one or more external networks 509. One or more external networks 509 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. The network interface may be a wired interface, wireless interface, or a combination of the two.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

While the methods and systems described herein have related, in greater part, to fueling transactions and fuel dispensation systems, one of skill in the art will appreciate that the methods and systems may be applied to any of a number of transaction types and service systems where the user is required to provide or enter data at a specific location. For example, a transaction request for tire air may be processed and authorized in much the same way as fuel. Specifically, the authenticator may be provided at the air dispenser and the transaction request may be authorized and activated based on the presence of the vehicle in the service station and the entry of the authenticator at the air dispenser. Other transaction types that may similarly implement the aforementioned methods and systems include maintenance service requests (e.g., oil change, changing tires, vehicle washing, etc.), parking reservation requests and/or cargo pick-up/drop-off requests. Further, other shipping and transportation industries may also implement the systems and methods described herein. For example, mail and other cargo are commonly transported by airplane and/or boat. As such, the flexibility and convenience provided by the system described herein may also be used to streamline airplane and boat operations such as refueling and maintenance services.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method comprising:
   detecting, by a sensor of a fueling station computing system, entry of a wireless tag of a vehicle into a predefined general wireless service area of a fueling station, the sensor being common to a plurality of fuel pumps of the fueling station;
   receiving, by the fueling station computing system and from the wireless tag, identification information and transaction payment information for at least one of a driver of the vehicle and the vehicle in response to detecting the entry of the wireless tag into the predefined general wireless service area;
   initiating processing of a transaction for the vehicle using the received identification information and transaction payment information;
   after initiating the processing of the transaction, receiving, through an input device specific to one of the fuel pumps of the fueling station computing system and separately from the identification information, an authenticator different from the identification and transaction payment information received from the wireless tag;
   determining, by the fueling station computing system, the one of the fuel pumps at which the vehicle is located by matching the authenticator with the identification and transaction payment information received from the wireless tag; and
   determining, by the fueling station computing system, whether to authorize a fueling transaction based on the authenticator and the transaction payment information.

2. The method of claim 1, wherein the wireless tag is a radio frequency identification (RFID) tag.

3. The method of claim 1, wherein the predefined general wireless service area is coterminous with a fueling service station.

4. The method of claim 1, wherein the predefined general wireless service area is coterminous with a lane of fueling pumps of a fueling service station.

5. The method of claim 1, wherein the fueling station is owned by a company and wherein the authenticator includes an identifier of a user specific to the company.

6. The method of claim 1, wherein the authenticator includes an identifier of a user for a loyalty rewards program.

7. The method of claim 1, further comprising:
   in response to determining the transaction is to be authorized, authorizing the transaction.

8. The method of claim 1, further comprising: in response to determining the transaction is not to be authorized, transmitting a request for additional information to a point of sale.

9. The method of claim 1, wherein the identification information includes at least one of:
   user identification information, and vehicle identification information.

10. A method, comprising:
    detecting, by a sensor of a fueling station computing system, entry of a wireless tag of a vehicle into a predefined general wireless service area of a fueling station;
    receiving, by the fueling station computing system, identification information in response to detecting the entry of the wireless tag into the predefined general wireless service area;
    initiating processing, by the fueling station computing system, of the received identification information to pre-authorize a fueling transaction;
    after initiating the processing of the received identification information to pre-authorize the fueling transaction, receiving, through an input device specific to a fuel pump of the fueling station, an authenticator different from the identification information received from the wireless tag, the sensor being common to a plurality of fuel pumps of the fueling station;
    determining, by the computing device, whether the pre-authorized fueling transaction corresponds to the received authenticator; and
    responsive to determining that the pre-authorized transaction corresponds to the authenticator, associating, by the computing device, the authenticator with the pre-authorized fueling transaction and authorizing the fueling transaction based on the associated pre-authorized fueling transaction and authenticator.

11. The method of claim 10, further comprising:
    in response to determining that the pre-authorized fueling transaction does not correspond to the authenticator, utilizing the authenticator in a subsequent attempt to authorize the fueling transaction.

12. The method of claim 10, wherein the authenticator is at least one of: a warehouse club membership card, a warehouse club membership identifier, a loyalty program membership card and a loyalty program membership identifier.

13. A non-transitory computer-readable medium storing instructions that, when executed by one or more processors, cause fueling station computing system to:
    cause a sensor of the fueling station computing system to detect entry of a wireless tag of a vehicle into a predefined general wireless service area of a fueling station, the sensor being common to a plurality of fuel pumps of the fueling station;
    receive, from the wireless tag, identification information and transaction payment information in response to detecting the wireless tag in the predefined general wireless service area;
    initiate processing of a transaction for the vehicle using the received identification information and transaction payment information;
    after initiating the processing of the transaction, receive, through an input device specific to a fuel pump of the fueling station, an authenticator different from the identification and transaction payment information received from the wireless tag;

match the authenticator information with the identification and transaction payment information received from the wireless tag; and determine whether to authorize a fueling transaction based on the authenticator and the identification and transaction payment information.

14. The non-transitory computer readable medium of claim 13, wherein the media further stores instructions that, when executed, cause the fueling station computing system to:

in response to a determination that the transaction is to be authorized authorizing the transaction.

15. The non-transitory computer readable medium of claim 13, further including instructions that, when executed, cause the fueling station computing system to:

in response to determining the transaction is not to be authorized, transmitting a request for additional information to a point of sale.

16. The non-transitory computer readable medium of claim 13, wherein the authenticator information is received by the one or more processors from a fueling pump where the authenticator information was entered, said fueling pump being located within the predefined general wireless service area.

17. The non-transitory computer readable medium of claim 10, wherein the wireless tag is a radio frequency identification (RFID) tag.

18. The non-transitory computer readable medium of claim 10, wherein the predefined general wireless service area is coterminous with a fueling service station.

19. The non-transitory computer readable medium of claim 10, wherein the predefined general wireless service area is coterminous with a lane of fueling pumps of a fueling service station.

* * * * *